(12) United States Patent
Park et al.

(10) Patent No.: US 10,856,307 B2
(45) Date of Patent: *Dec. 1, 2020

(54) METHOD FOR TRANSMITTING AND RECEIVING DOWNLINK PRE-EMPTION INDICATION INFORMATION USING BITMAP IN NEW RADIO NETWORKS AND APPARATUS THEREOF

(71) Applicant: KT CORPORATION, Gyeonggi-do (KR)

(72) Inventors: Kyujin Park, Seoul (KR); Woo-Jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/924,553

(22) Filed: Mar. 19, 2018

(65) Prior Publication Data

US 2018/0279326 A1    Sep. 27, 2018

(30) Foreign Application Priority Data

Mar. 21, 2017 (KR) .................... 10-2017-0035615
Aug. 9, 2017 (KR) .................... 10-2017-0101169
Feb. 6, 2018 (KR) .................... 10-2018-0014576

(51) Int. Cl.
*H04W 72/12* (2009.01)
*H04W 72/04* (2009.01)
*H04L 5/00* (2006.01)

(52) U.S. Cl.
CPC ........... *H04W 72/12* (2013.01); *H04L 5/0053* (2013.01); *H04L 5/0096* (2013.01);
(Continued)

(58) Field of Classification Search
CPC ............. H04W 72/12; H04W 72/1289; H04W 72/042; H04W 72/1273; H04L 5/0053;
(Continued)

(56) References Cited

U.S. PATENT DOCUMENTS

2017/0295592 A1    10/2017 Yang et al.
2018/0049203 A1*   2/2018 Xue .................. H04W 72/0453
(Continued)

FOREIGN PATENT DOCUMENTS

WO    2017/177083 A1    10/2017

OTHER PUBLICATIONS

Qualcomm Incorporated, "DL URLLC/eMBB dynamic multiplexing and indication design", R1-1702639, 3GPP TSG-RAN WG1 #88, Athens, Greece, Feb. 13-17, 2017, pp. 1-9.
(Continued)

*Primary Examiner* — Hassan A Phillips
*Assistant Examiner* — Mohammed S Chowdhury
(74) *Attorney, Agent, or Firm* — IP Legal Services, LLC

(57) ABSTRACT

Provided is a method for transmitting and receiving downlink pre-emption indication information using a bitmap in a next-generation/5G radio access network. The method may include: receiving monitoring configuration information for downlink pre-emption indication information from a base station; monitoring downlink pre-emption indication information based on the monitoring configuration information; and receiving the downlink pre-emption indication information from the base station, wherein the downlink pre-emption indication information includes a bitmap indicating information on at least one of time-section resources and frequency-section resources in which pre-emption has occurred, among reference downlink resources.

9 Claims, 7 Drawing Sheets

(52) U.S. Cl.
CPC ..... *H04W 72/042* (2013.01); *H04W 72/1289* (2013.01); *H04W 72/1273* (2013.01); *Y02D 70/00* (2018.01); *Y02D 70/10* (2018.01); *Y02D 70/12* (2018.01); *Y02D 70/1262* (2018.01); *Y02D 70/1264* (2018.01); *Y02D 70/20* (2018.01); *Y02D 70/21* (2018.01); *Y02D 70/25* (2018.01)

(58) Field of Classification Search
CPC ...... H04L 5/0096; Y02D 70/00; Y02D 70/21; Y02D 70/12; Y02D 70/25; Y02D 70/1262; Y02D 70/20; Y02D 70/10; Y02D 70/1264
USPC .......................................................... 370/329
See application file for complete search history.

(56) References Cited

U.S. PATENT DOCUMENTS

| | | | |
|---|---|---|---|
| 2018/0063865 A1* | 3/2018 | Islam | H04W 72/044 |
| 2018/0070341 A1* | 3/2018 | Islam | H04L 1/1887 |
| 2018/0191470 A1* | 7/2018 | Manolakos | H04L 1/1854 |
| 2019/0165906 A1 | 5/2019 | Bala et al. | |
| 2019/0268930 A1 | 8/2019 | Rudolf et al. | |

OTHER PUBLICATIONS

ZTE et al., "About URLLC and eMBB multiplexing in downlink", R1-1700264, 3GPP TSG RAN WG1 AH_NR Meeting, Spokane, USA, Jan. 16-20, 2017, pp. 1-10.
Nokia et al., "On the mini-slot design in NR", R1-1701052, 3GPP TSG-RAN WG1#NR, Spokane, USA, Jan. 16-20, 2017, pp. 1-9.
ZTE, "About pre-emption indication", R1-1710123, 3GPP TSG RAN WG1 NR Ad-Hoc#2, Qingdao, China, Jun. 27-30, 2017, pp. 1-6.
Catt, "[89-20] email discussion: Group-common PDCCH for NR", R1-1710968, 3GPP TSG RAN WG1 Meeting #AH_NR2, Qingdao, P. R. China, Jun. 27-30, 2017, pp. 1-22.
U.S. Appl. No. 62/417,933, filed Nov. 4, 2016.
U.S. Appl. No. 62/435,019, filed Dec. 15, 2016.
Fujitsu, "Discussion on Preemption Indicator for Multiplexing eMBB and URLLC in Downlink", R1-1701920, 3GPP TSG-RAN WG1 Meeting#88, Athens, Greece Feb. 13-17, 2017, pp. 1-5.
Nokia et al., "On indication for downlink punctured / preemptive scheduling", R1-1703327, 3GPP TSG-RAN WG1#88, Athens, Athens, Greece, Feb. 13-17, 2017, pp. 1-4.
Samsung, "Summary of e-mail discussions on multiplexing eMBB and URLLC in DL", R1-1700972, TSG-RAN WG1 NR Ad-hoc Meeting, Spokane, USA, Jan. 16-20, 2017, pp. 1-23.

* cited by examiner

METHOD FOR TRANSMITTING AND RECEIVING DOWNLINK PRE-EMPTION INDICATION INFORMATION USING BITMAP IN NEW RADIO NETWORKS AND APPARATUS THEREOF

CROSS REFERENCE TO RELATED APPLICATION

This application claims priority from Korean Patent Application Nos. 10-2017-0035615, 10-2017-0101169 & 10-2018-0014576 filed on Mar. 21, 2017, Aug. 9, 2017 & Feb. 6, 2018 which are hereby incorporated by reference for all purposes as if fully set forth herein.

BACKGROUND OF THE INVENTION

1. Field of the Invention

The present embodiments relate to a method for transmitting and receiving downlink pre-emption indication information using a bitmap in a next-generation/5G radio access network {hereinafter, also referred to as "NR (New Radio)"}.

2. Description of the Prior Art

3rd generation partnership project (3GPP) has recently approved the study item "Study on New Radio Access Technology" for studying next-generation/5G radio access technology. Based on the same, 3GPP is discussing a frame structure, channel coding & modulation, waveform & multiple access schemes, and the like for NR (New Radio) in radio access network working group 1 (RAN WG1). It is required to design the NR to satisfy various requirements for respective segmented and specified usage scenarios, as well as an improved data transmission rate in comparison with long term evolution (LTE)/LTE-Advanced.

Enhanced Mobile BroadBand (eMBB), massive Machine-Type Communication (mMTC), and Ultra Reliable and Low Latency Communication (URLLC) have been proposed as typical usage scenarios of the NR, and flexible frame structure design is required, compared to LTE/LTE-Advanced, to meet the requirements of the respective scenarios.

In particular, services, such as eMBB and mMTC in the NR, are more efficient as time-section resource assignment is lengthened in terms of cell throughput and coverage, while a service of URLLC is more efficient as time-section resource assignment is shortened because of a latency problem. Therefore, it is necessary to support efficient multiplexing for data traffic between the respective services in a network that simultaneously provides the above-mentioned eMBB, mMTC, and URLLC services.

SUMMARY OF THE INVENTION

An aspect of the present embodiments is to provide a specific method for supporting efficient multiplexing for data traffic between respective services in a network that simultaneously provides the eMBB, mMTC, and URLLC services.

An embodiment, which has been made in order to solve the above problem, provides a method for receiving downlink pre-emption indication information by a user equipment, the method including: receiving monitoring configuration information for downlink pre-emption indication information from a base station; monitoring downlink pre-emption indication information based on the monitoring configuration information; and receiving the downlink pre-emption indication information from the base station, wherein the downlink pre-emption indication information includes a bitmap indicating information on time-section resources or frequency-section resources in which pre-emption has occurred, among reference downlink resources.

Another embodiment provides a method for transmitting downlink pre-emption indication information by a base station, the method including: configuring monitoring configuration information for downlink pre-emption indication information; transmitting the monitoring configuration information to a user equipment; and transmitting the downlink pre-emption indication information to the user equipment when downlink pre-emption occurs, wherein the downlink pre-emption indication information includes a bitmap indicating information on time-section resources or frequency-section resources in which pre-emption has occurred, among reference downlink resources.

Another embodiment provides a user equipment for receiving downlink pre-emption indication information, which includes: a receiver configured to receive monitoring configuration information for downlink pre-emption indication information from a base station and configured to receive the downlink pre-emption indication information from the base station; and a controller configured to monitor the downlink pre-emption indication information based on the monitoring configuration information, wherein the downlink pre-emption indication information includes a bitmap indicating information on time-section resources or frequency-section resources in which pre-emption has occurred, among reference downlink resources.

Further, another embodiment provides a base station for transmitting downlink pre-emption indication information, which includes: a controller configured to configure monitoring configuration information for downlink pre-emption indication information; and a transmitter configured to transmit the monitoring configuration information to a user equipment and configured to transmit the downlink pre-emption indication information to the user equipment when downlink pre-emption occurs, wherein the downlink pre-emption indication information includes a bitmap indicating information on time-section resources or frequency-section resources in which pre-emption has occurred, among reference downlink resources.

According to the present embodiments, it is possible to provide a specific method for supporting efficient multiplexing for data traffic between the respective services in a network in which the eMBB, mMTC, and URLLC services are mixed in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
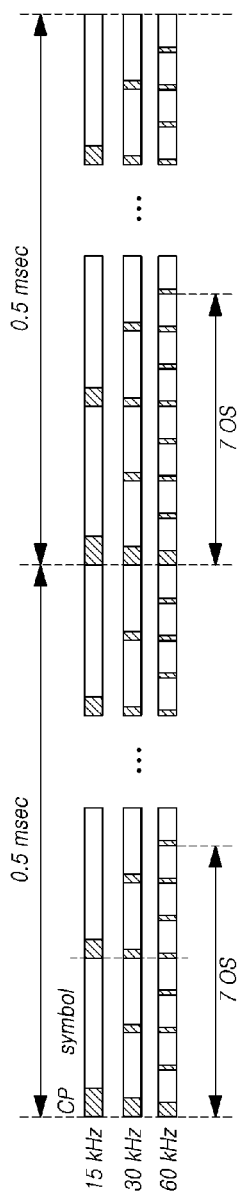
FIG. 1 is a diagram illustrating OFDM symbol alignment in case of using different subcarrier spacing according to at least one of embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

As used herein, a wireless communication system may be a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), LTE, high speed packet access (HSPA), international mobile telecommunication (IMT-2020) (5G or New Radio), and the like, and a MS (Mobile station), a UT (User Terminal), an SS (Subscriber Station), a wireless device, and the like in global systems for mobile communication (GSM).

A base station or a cell may generally refer to a station where communication with a User Equipment (UE) is performed. Such a base station or a cell may denote, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or transceiving point), a Relay Node, a Mega Cell, a Macro Cell, a Micro Cell, a Pico Cell, a Femto Cell, a Remote Radio Head (RRH), a Radio Unit (RU), and a Small Cell.

Each of the above mentioned various cells has a base station that controls a corresponding cell, and thus, the base station may be construed in two ways. 1) the base station may be a device itself that provides a megacell, a macrocell, a microcell, a picocell, a femtocell, and a small cell in association with a wireless area, or 2) the base station may indicate a wireless area itself. In 1), all devices that interact with one another so as to enable the devices that provide a predetermined wireless area to be controlled by an identical entity or to cooperatively configure the wireless area, may be indicated as a base station. Based on a configuration type of a wireless area, a point, a transmission/reception point, a transmission point, a reception point, or the like may be an embodiment of a base station. In ii), a wireless area itself that receives or transmits a signal from a perspective of a terminal or a neighbouring base station, may be indicated as a base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications. However, the user equipment and the base station may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using one of i) a TDD (Time Division Duplex) scheme that performs transmission based on different times and ii) an FDD (Frequency Division Duplex) scheme that performs transmission based on different frequencies or a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like, and may be configured as a data channel, such as PDSCH (Physical Downlink Shared CHannel), PUSCH (Physical Uplink Shared CHannel), and the like, to transmit data.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation, in which signals are transmitted and received through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signalling includes an radio resource control (RRC) signalling that transmits RRC information including an RRC parameter.

A base station performs downlink transmission to terminals. A base station may transmit a physical downlink control channel for transmitting downlink control information such as scheduling required to receive a downlink data channel that is a main physical channel for unicast transmission, and scheduling approval information for transmission on an uplink data channel. Hereinafter, transmission and reception of a signal through each channel will be described as transmission and reception of a corresponding channel.

Varied multiple access schemes may be unrestrictedly applied to the wireless communication system. Various multiple access schemes, such as TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like may be used.

Here, NOMA includes SCMA (Sparse Code Multiple Access), LDS (Low Cost Spreading), and the like.

An embodiment of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type. Alternatively, the MTC terminal may refer to a further Enhanced MTC terminal defined in Release-14.

In the present specification, a NarrowBand-Internet of Things (NB-IoT) user equipment represents a user equipment supporting radio access for the cellular IoT. The objectives of NB-IoT technology include improved indoor coverage, support for large-scale and low-speed user equipments, low-latency sensitivity, low-cost user equipments, low power consumption, and optimized network architecture.

Enhanced Mobile Broadband (eMBB), massive Machine-Type Communication (mMTC), and Ultra Reliable and Low Latency Communication (URLLC) have been proposed as typical usage scenarios in NR (New Radio). Thus, they are under discussion in 3GPP.

In the present specification, a frequency, a frame, a subframe, a resource, a resource block, a region, a band, a subband, a control channel, a data channel, a synchronization signal, various reference signals, various signals, and various messages in relation to NR (New Radio) may be interpreted according to various meanings, which have been used in the past, are being used presently, or will be used in the future.

NR (New Radio)

Recently, 3GPP has approved the study item "Study on New Radio Access Technology" for research on next-generation/5G radio access technology, and has started discussions on a frame structure, channel coding & modulation, waveform & multiple access schemes, and the like for NR (New Radio) based on the same.

It is required to design the NR to satisfy various requirements for respective segmented and specified usage scenarios, as well as an improved data transmission rate in comparison with LTE/LTE-Advanced. In particular, enhanced Mobile BroadBand (eMBB), massive Machine-Type Communication (mMTC), and Ultra Reliable and Low Latency Communication (URLLC) have been proposed as typical usage scenarios of the NR, and flexible frame structure design is required, compared to LTE/LTE-Advanced, in order to meet the requirements of the respective scenarios.

More specifically, eMBB, mMTC, and URLLC are under consideration as typical usage scenarios of the NR, which are under discussion in 3GPP. The respective usage scenarios have different requirements for data rates, latency, coverage, or the like. Thus, in order to efficiently satisfy the requirements for the respective usage scenarios through a frequency band constituting an NR system, there is a need for a method of efficiently multiplexing radio resource units on the basis of different numerologies (e.g., subcarrier spacing, subframes, TTIs, or the like).

To this end, there have been discussions on a method of multiplexing and supporting numerologies having different subcarrier spacing (SCS) values, based on TDM, FDM, or TDM/FDM, through a single NR carrier and a method of supporting one or more time units when a scheduling unit is configured in a time domain. In this regard, in the NR, a subframe has been defined as one of time-domain structures, and there was a decision to define, as a reference numerology for defining corresponding subframe duration, a single subframe duration including 14 OFDM symbols of normal CP overhead on the basis of 15 kHz-subcarrier spacing (SCS), which is the same as LTE. According to this, the subframe in the NR has a time duration of 1 ms. However, unlike the LTE, a slot and a mini-slot may be defined as a time unit, which is a basis of actual uplink/downlink data scheduling, for the absolute reference time duration in the subframe of the NR. In this case, the number of OFDM symbols (a y-value) constituting the corresponding slot has been determined to have a value of y=14 irrespective of the numerology.

Accordingly, any slot may include 14 symbols. All of the symbols may be used for downlink (DL) transmission, all of the symbols may be used for uplink (UL) transmission, or the symbols may be used in the form of a DL portion+a gap+a UL portion according to a transmission direction of the corresponding slot.

In addition, a mini-slot including fewer symbols than a corresponding slot may be defined in a numerology (or SCS), and based on the same a short time-domain scheduling interval may be configured for uplink/downlink data transmission/reception, or a long time-domain scheduling interval may be configured through slot aggregation for uplink/downlink data transmission/reception.

In particular, in the case of transmission/reception of latency-critical data such as URLLC, when the scheduling is performed in a slot unit of 0.5 ms (7 symbols) or 1 ms (14 symbols) defined in a frame structure based on a numerology having a small SCS value such as 15 kHz, it may be difficult to satisfy the latency requirements. Therefore, a mini-slot including fewer OFDM symbols than the corresponding slot may be defined, thereby enabling the scheduling for latency-critical data, such as the URLLC, based on the same.

Alternatively, a method is also under consideration for supporting numerologies having different SCS values by multiplexing the same using a TDM scheme or an FDM scheme in a single NR carrier as described above, thereby scheduling data to conform to the latency requirements based on a slot (mini-slot) length defined for each numerology. For example, in the case where the SCS is 60 kHz as shown in FIG. 1, the symbol length thereof is reduced to about ¼ of the symbol length for the SCS of 15 kHz. Therefore, when a single slot includes 7 OFDM symbols, the 15 kHz-based slot is 0.5 ms long, while the 60 kHz-based slot length is reduced to about 0.125 ms.

That is, in the NR, there is discussion on a method for satisfying the respective requirements of the URLLC and the eMBB by defining different SCS or different TTIs.

As described above, there is a discussion on a method for supporting scheduling units having different lengths in a time domain to satisfy various usage scenarios in the NR. In particular, to satisfy the URLLC requirements, it is necessary to subdivide the scheduling unit in the time domain. However, excessively subdivided time-domain scheduling units are not desirable in terms of cell throughput for the eMBB because they involve excessive control overhead. In addition, a longer time-section resource assignment structure may be more suitable for the coverage enhancement in terms of the mMTC.

In accordance with at least one embodiment, a downlink control information configuration and transmission/reception method may be provided for supporting efficient multiplexing for data traffic between respective services in a network that simultaneously provides services, which are efficient for long time-section resource assignment, such as eMBB and mMTC, and services requiring short time-section resource assignment, such as URLLC.

The embodiments described below may be applied to user equipments, base stations, and core network entities (MME) using any mobile communication technology. For example, the embodiments may be applied to next-generation mobile communication (5G mobile communication or New-RAT) user equipments, base stations, and core network entities {Access and Mobility function (AMF)}, as well as mobile communication user equipments adopting LTE technology. Hereinafter, for the convenience of description, a base station may represent an eNB of an LTE/E-UTRAN or a base station {a CU (Central Unit), a DU (Distributed Unit), or a single logical entity implemented by a CU and a DU} or a gNB in a 5G wireless network in which the CU and the DU are separated.

In the usage scenario of the NR, the URLLC is a service for supporting high reliability and low latency, which is used in the case where delay of data transmission/reception causes a serious problem even though a small amount of data is transmitted/received. For example, the URLLC service may be used for an autonomous vehicle, wherein if the delay of data transmission/reception increases, human and material damages due to traffic accidents may occur.

The eMBB is a service that is used when a large amount of data is required to be transmitted/received using a service supporting high-speed data transmission. For example, when a large amount of data needs to be transmitted per unit time, such as a 3D video or UHD service, the eMBB service may be used.

The mMTC is a service that is used when low power consumption is required while a small amount of data is transmitted/received and the delay thereof does not cause a problem. For example, the mMTC service may be used for sensor devices provided to build a smart city because a battery mounted in the sensor device must be operated for as long a time as possible.

In general, one of the three services (i.e., the URLLC, the eMBB, and the mMTC) described above may be provided to a user equipment according to the characteristics thereof. Hereinafter, a user equipment using the URLLC service may be referred to as an URLLC user equipment, a user equipment using the eMBB service may be referred to as an eMBB user equipment, and a user equipment using the mMTC service may be referred to as an mMTC user equipment. In addition, the eMBB, the mMTC, and the URLLC may also be interpreted as an eMBB user equipment, an mMTC user equipment, and an URLLC user equipment, respectively.

In the specification, the term "pre-emption" means re-assignment of some of the resources, which have been assigned to the eMBB or the mMTC, to the URLLC in order to satisfy the latency requirements for the URLLC when traffic occurs in the URLLC. Such a term "pre-emption" may also be expressed using the term "puncturing" or "superposition" as will be described in the embodiments below. However, the present disclosure is not limited to specific terms. When pre-emption occurs, downlink data transmission to the eMBB user equipment is interrupted and thus made discontinuous in the middle of transmission in order to perform downlink data transmission to the URLLC user equipment. Therefore, in the embodiment, the occurrence of pre-emption may be interpreted to mean that discontinuous transmission occurs in the eMBB user equipment, and the occurrence of pre-emption may be expressed as the occurrence of discontinuous transmission.

At this time, since the resources that have already been assigned to the eMBB or the mMTC are used for the URLLC, the eMBB user equipment or the mMTC user equipment having resources assigned thereto is required to receive information on the resources to be pre-empted. The downlink pre-emption refers to the pre-emption for downlink resources of the user equipment.

The downlink pre-emption indication information is intended to indicate to the user equipment the data channel that is pre-empted in the downlink, and the downlink pre-emption indication information may be referred to as downlink pre-emption notification information because it informs the user equipment of the downlink pre-emption. The downlink pre-emption indication information may be transmitted in the form of a signal or a channel.

Hereinafter, various embodiments of a method, in which a user equipment and a base station transmit and receive downlink pre-emption indication information, will be described in more detail.

The embodiments described below may be applied individually or by means of a combination thereof.

As described above, to support the URLLC service in the NR, it is necessary to support a short scheduling unit {or Transmission Time Interval (TTI)} capable of satisfying a latency boundary in the time domain. On the other hand, in the case of the eMBB or the mMTC, it may be efficient to apply a longer time-section resource assignment unit than a usage scenario of the URLLC in terms of control overhead and coverage when defining a scheduling unit in the time domain.

In order to satisfy various usage scenarios of the NR as described above, it is necessary to support a mixed numerology structure supporting a numerology of subcarrier spacing (e.g., larger subcarrier spacing, such as 60 kHz, 120 kHz, or the like), which makes it easy to define a short time-section resource assignment unit suitable for the URLLC, and a numerology of subcarrier spacing suitable for the eMBB and the mMTC (e.g., 15 kHz for the eMBB or 3.75 kHz for the mMTC) through a single NR carrier, or to support time-domain scheduling units having different lengths, such as subframes, slots, or mini-slots, in an NR carrier that operates as a single numerology.

One example of a method for this may be defined such that time/frequency resources (or regions), which are assigned based on optimal scheduling units for the respective usage scenarios, are assigned semi-statically and resource assignment is performed using time/frequency resources of the region corresponding to the usage scenarios for the respective user equipments according thereto.

However, semi-static resource assignment is inefficient in terms of radio resource utilization in an environment in which traffic is randomly generated for each usage scenario.

In order to solve this problem, when assigning downlink data transmission resources, it is required to support dynamic puncturing-based eMBB/URLLC multiplexing in which some of the downlink radio resources that have been assigned for eMBB or mMTC data transmission are punctured and used for urgent URLLC data transmission/reception or to support superposition-based eMBB/URLLC multiplexing in which URLLC data transmission signals are superposed onto some of the radio resources to then be transmitted.

In other words, a method is under consideration, which supports dynamic resource sharing between the eMBB and the URLLC such that some resources are punctured (or superposed) from among the eMBB (or mMTC) downlink resources, which have already been assigned and through which transmission is ongoing, and are used for urgent URLLC data transmission.

Additionally, a method is under consideration, in which when a dynamic resource sharing method on the basis of dynamic puncturing (or superposition) between the eMBB and the URLLC is applied to NR downlink, a corresponding eMBB user equipment receives an indication on the radio resources punctured for the URLLC data transmission through explicit signaling.

As the explicit signaling-based indication method, a method of indicating to the eMBB user equipment the puncturing information within a TTI (or slot, mini-slot, or aggregated slots) in which downlink data transmission is in progress and a method of indicating to the eMBB user equipment the puncturing information through a TTI subsequent to the corresponding TTI are under consideration.

In accordance with at least one embodiment, a method may be provided for configuring, transmitting, and receiving puncturing indication control information for the eMBB user equipment when applying dynamic resource sharing between the eMBB and the URLLC as described above.

Although the embodiment will be described based on usage scenarios of the eMBB, the URLLC, or the like, from viewpoints of radio resource assignment and downlink data transmission/reception, the eMBB may correspond to a user equipment or a data session in which a long time-section resource assignment unit in a unit of a slot or aggregated slots is defined, and the URLLC may correspond to a user equipment or a data session in which a short time-section resource assignment unit, such as a mini-slot, symbol, or large SCS (e.g., 60 kHz or 120 kHz)-based slot unit, is defined.

More specifically, the embodiment may be applied to any PDSCH transmission/reception using partial radio resource puncturing from ongoing downlink transmission, in which puncturing (or superposition) is performed in a unit of a mini-slot or a symbol from the downlink data transmission resources assigned in a unit of a slot or slots or in which only some frequency resources (some PRBs) are punctured (or superposed) even in the corresponding mini-slot or symbol.

Figure 2:
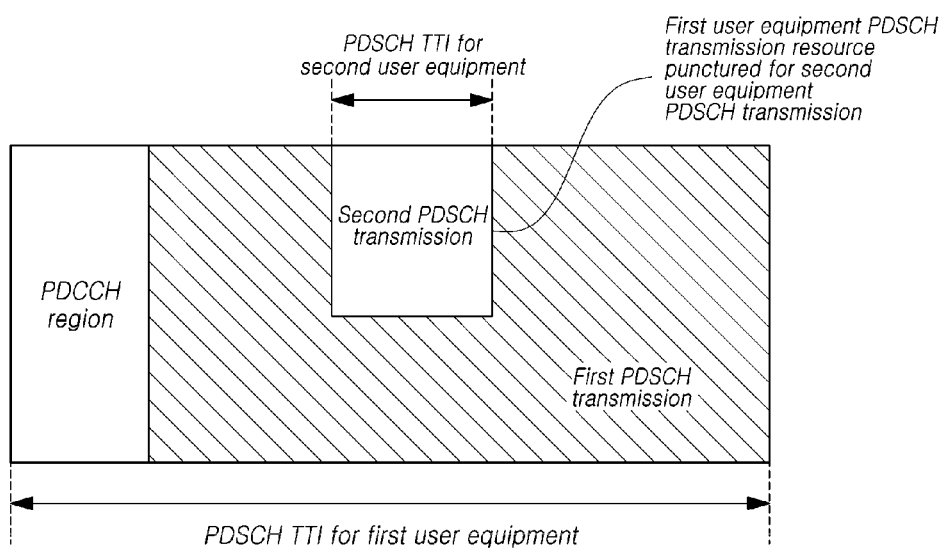
FIG. 2 is a diagram illustrating a resource when a single pre-emption occurs between eMBB and URLLC in the downlink according to at least one of embodiments.

Accordingly, as shown in FIG. 2 below, a first user equipment (e.g., an eMBB user equipment) or data corresponds to downlink data transmission on the basis of a scheduling unit in a slot unit or a long time-section unit, in which the puncturing can be performed among given downlink data transmission resources in the embodiment. In addition, a second user equipment (e.g., a URLLC user equipment) or data corresponds to downlink data transmission in which some of the downlink resources, which have been assigned for the eMBB user equipment or data transmission, are punctured and used.

In accordance with at least one embodiment, a control information configuration method may be provided for indicating to the first user equipment the puncturing of some of the PDSCH transmission resources of the first user equipment for PDSCH transmission of the second user equipment as shown in FIG. 2 and a radio resource assignment method for transmitting and receiving the same.

However, the embodiment is not limited to specific terms. That is, in the case of applying a pre-emption-based PDSCH multiplexing method, in which some of the ready-assigned PDSCH transmission resources (e.g., some of the first PDSCH transmission resources for the first user equipment) are punctured and used for latency-critical PDSCH transmission (i.e., second PDSCH transmission for the second user equipment) as a multiplexing method between data transmissions having different latency requirements or between data transmissions in which different Transmission Time Interval (TTI)-based scheduling is performed according thereto, although downlink control information of a base station for indicating to the first user equipment information on transmission resources that are punctured for the second PDSCH transmission from among the first PDSCH transmission resources is referred to as puncturing indication downlink control information (DCI), the present embodiment is not limited to that term, and it may also be referred to using other terms such as pre-emption indication DCI or the like.

Definition of Downlink Control Information (DCI) Format for Puncturing Indication/Pre-Emotion Indication A puncturing indication/pre-emption indication DCI format may be defined for puncturing indication/pre-emption indication, in addition to a DCI format used for transmitting scheduling control information for resource assignment used for PDSCH/PUSCH transmission/reception {e.g., a downlink (DL) assignment DCI format and an uplink (UL) grant DCI format}, but the present disclosure is not limited to the terms.

As to the example shown in FIG. 2, the puncturing indication/pre-emption indication DCI format is intended to indicate to a first user equipment information on the radio resources punctured (or superposed) for the second PDSCH transmission of the second user equipment from the first PDSCH transmission resources assigned to the first user equipment. Detailed embodiments for configuring the DCI format, which are proposed in the present disclosure, will be described below.

First Embodiment

Puncturing indication/pre-emption indication information may be defined as being UE-specific signalling. When applying dynamic resource sharing between a first user equipment and a second user equipment, it is possible to perform configuration such that only puncturing for at most one mini-slot level (or a continuous symbol level) is allowed with respect to a single PDSCH transmission, which is transmitted in a unit of a slot or slots.

That is, as shown in FIG. 2, definition may be made such that puncturing is allowed for only at most one second PDSCH transmission in the first PDSCH region. In this case, the DCI format for the corresponding puncturing indication/pre-emption indication may be defined to include information such as a mini-slot index, a symbol index, or a starting symbol index for indication of the punctured time-section resources and the number of symbols constituting the time-section resources (e.g., starting symbol index+symbol duration).

The length of a mini-slot (i.e., the number of symbols constituting the mini-slot), which is a unit of puncturing, a mini-slot boundary constituting a single DL (centric) slot, and the number thereof may be determined i) through UE-specific/cell-specific higher layer signalling for respective user equipments, ii) dynamically through a puncturing indication/pre-emption indication signal, or iii) implicitly by a subcarrier spacing (SCS) value set in the corresponding user equipment/cell/slot.

The puncturing indication/pre-emption indication information may include indication information on punctured physical resource blocks (PRBs) in the punctured mini-slot. At this time, the information indicating the punctured PRBs may be defined to i) be signaled in the manner indicated through a bitmap in a unit of a PRB group including assigned PRBs or a plurality of localized or distributed PRBs, or ii) reuse PRB assignment information included in second PDSCH scheduling control information (i.e., a DL assignment DCI format for the second PDSCH of the second user equipment).

The puncturing indication/pre-emption indication information may be defined to include a transmission/pre-emption/puncturing type. However, the present disclosure is not limited to the term above. The transmission/pre-emption/puncturing type may be defined as being an information region indicating whether the second PDSCH transmission is performed based on puncturing of the first PDSCH or is performed by means of superposition in the radio resources.

The puncturing indication/pre-emption indication information may further include information on whether to retransmit the first PDSCH corresponding to the punctured or superposed radio resource regions or all of the first PDSCHs and information on reconfiguration of the PUCCH for HARQ ACK/NACK feedback of the first user equipment.

Second Embodiment

Figure 3:
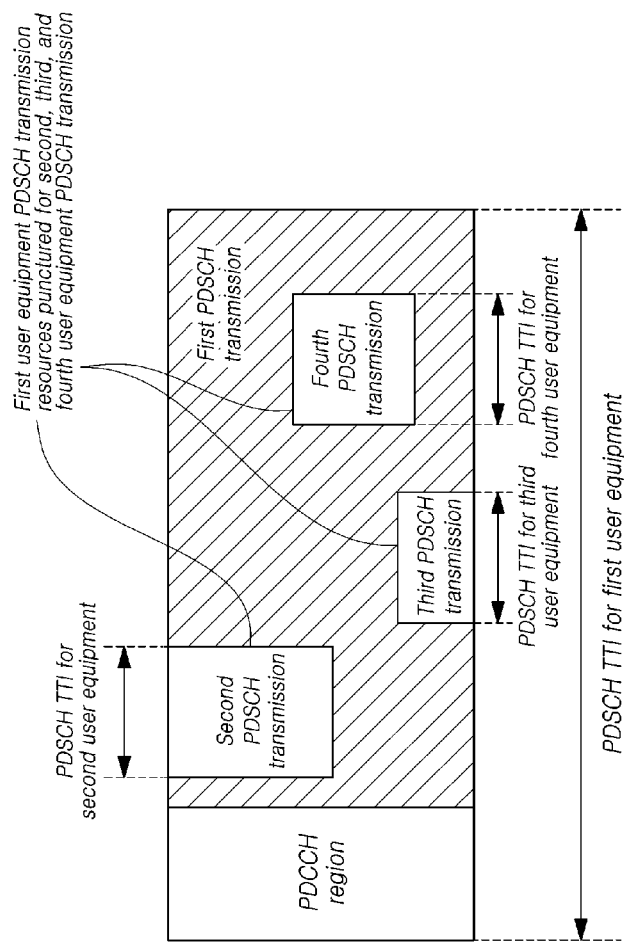
FIG. 3 is a diagram illustrating resources when multiple pre-emption occurs between eMBB and URLLC in the downlink according to at least one of embodiments.

Puncturing indication/pre-emption indication information may be defined as being UE-specific signalling. Definition may be made such that puncturing for PDSCH transmission for a plurality of user equipments or for a plurality of PDSCH transmissions is allowed in the first PDSCH transmission for a first user equipment in which PDSCH resource assignment has been performed in a unit of a slot or slots. That is, definition may be made such that puncturing for a plurality of PDSCH transmissions, such as a second PDSCH, a third PDSCH, a fourth PDSCH, and the like, is allowed in the first PDSCH region by a base station/network/cell, as shown in FIG. 3.

In this case, signalling of the puncturing indication/pre-emption indication information may be configured to be performed for the second PDSCH, the third PDSCH, and the fourth PDSCH, respectively, through separate puncturing indication/pre-emption indication DCI.

More specifically, a single puncturing indication/pre-emption indication DCI format may be defined to indicate puncturing or pre-emption information through a single PDSCH transmission as shown in the first embodiment, and when puncturing is performed by means of a plurality of PDSCHs, a plurality of pieces of puncturing indication/pre-emption indication DCI corresponding to the number of PDSCHs is separately configured to then be transmitted to the first user equipment.

As an alternative method for puncturing indication/pre-emption indication when multiple puncturing is supported, the puncturing by a plurality of PDSCHs may be configured to be simultaneously indicated through a single puncturing indication/pre-emption indication DCI format. In this case, the puncturing indication/pre-emption indication DCI format may include an information region indicating the number of punctured mini-slots or the number of PDSCHs that are punctured and transmitted within a corresponding PDSCH TTI.

Since puncturing is performed for three mini-slots or three PDSCH transmissions in the first PDSCH transmission TTI m FIG. 3, an information region for indicating the same may be defined in the corresponding puncturing indication/pre-emption indication DCI format.

Alternatively, definition may be made such that a bitmap is configured in a unit of a mini-slot (or in a unit of a symbol or a symbol group) constituting the PDSCH transmission TTI and then the puncturing is indicated in a bitmap manner in the respective mini-slots (or symbols or symbol groups).

Alternatively, the number of punctured mini-slots or the number of PDSCHs that are punctured and transmitted may be configured to be implicitly indicated using an aggregation level of the puncturing indication/pre-emption indication DCI {i.e., a function including parameters such as the amount of radio resource used for transmission of the puncturing indication/pre-emption indication DCI, the number of control channel elements (CCEs), or a search space (SS) through which the puncturing indication/pre-emption indication DCI is transmitted according thereto}.

In addition, PRB assignment information in the mini-slot, the transmission/pre-emption/puncturing type, information on whether to perform retransmission, PUCCH reconfiguration information for HARQ ACK/NACK feedback of the first user equipment, and the like may be transmitted in the same manner as in the first embodiment described above.

However, in the first and second embodiments described above, an RNTI value of a user equipment (UE) for monitoring the puncturing indication/pre-emption indication DCI may be equal to a UE-specific RNTI value assigned for scheduling DCI format monitoring of the user equipment, or a separate UE-specific RNTI for monitoring DCI indicating puncturing may be assigned through higher layer signalling.

Third Embodiment

Puncturing indication/pre-emption indication information may be sent through cell-specific or TTI/slot/multi-slot-specific transmission.

More specifically, PDSCH transmission resource assignment information of the URLLC that has influenced the PDSCH of the eMBB in a unit of a cell/slot/multi-slot may be defined to be transmitted through UE-group common (may also be expressed as group-common) control signalling. That is, the puncturing indication/pre-emption indication DCI format may be sent through slot-specific or UE-group-specific transmission. The puncturing indication/pre-emption indication DCI format may include information indicating the PDSCH transmission resource of the URLLC, which has influenced the PDSCH of the eMBB in the corresponding slot (that is, the PDSCH transmission resource punctured and transmitted from the eMBB PDSCH resources).

To this end, a separate UE-group-specific RNTI or a cell-specific/slot-specific RNTI may be defined for monitoring the puncturing indication/pre-emption indication information. The RNTI may be assigned to each UE-group through UE-specific/cell-specific/UE-group-specific higher layer signalling. Or, the RNTI may be implicitly defined as a function of a slot index, a cell ID, or the like.

A detailed method of configuring an information region of the cell-specific or TTI/slot/multi-slot-specific puncturing indication DCI format may be conducted according to the first embodiment and the second embodiment described above.

That is, considering the case in which DCI of a UE-group common for puncturing indication/pre-emption indication is configured and the corresponding DCI is transmitted by a base station/network through UE-group common PDCCH, indication information for punctured/pre-empted radio resources, which is transmitted through the puncturing indication/pre-emption indication DCI, may include time-section resource indication information or frequency-section resource indication information, respectively. In addition, the time-section resource indication information and the frequency-section resource indication information may be configured according to the description of the first or second embodiment.

As a specific example of this, a pre-emption window and a pre-emption interval may be defined to configure information indicating the punctured or pre-empted time-section resource, but the present disclosure is not limited to specific terms.

The pre-emption window may be determined by a transmission period of the puncturing indication/pre-emption indication DCI or a period of a control resource set (CORESET) for the puncturing indication/pre-emption indication DCI transmission.

For example, the case is considered, in which the puncturing indication/pre-emption indication DCI for notifying of puncturing/pre-emption is transmitted in a period of a TTI of the first user equipment having a long time-section scheduling unit and a CORESET for the same is defined, as shown in FIG. 2 or FIG. 3. At this time, the TTI of the first user equipment may be defined as a pre-emption window.

Alternatively, when a signal indicating pre-emption is transmitted in a unit of a plurality of first PDSCH TTIs, a pre-emption window may be defined in a unit of the plurality of first PDSCH TTIs according to a transmission/reception period of the puncturing indication/pre-emption indication DCI.

The pre-emption interval may be determined by a time-section scheduling unit used for assigning the resources of the second PDSCH, the third PDSCH, and the fourth PDSCH, which perform pre-emption-based PDSCH transmission/reception by puncturing some of the first PDSCH transmission resources.

That is, the pre-emption interval may be determined in a unit of a TTI for PDSCH transmission/reception of the second user equipment, the third user equipment, or the fourth user equipment described above. Accordingly, when configuring monitoring configuration information for the puncturing indication/pre-emption indication DCI of a user equipment (e.g., the first user equipment), in addition thereto, the base station/network may directly configure information on the pre-emption window and may transmit the same to the user equipment through higher layer signalling.

Alternatively, it is possible to perform configuration such that the base station/network transmits, to the user equipment through higher layer signalling, information for setting a CORESET period for monitoring puncturing indication/pre-emption indication DCI for a user equipment (e.g., the first user equipment) and the user equipment infers information on the pre-emption window based on the same.

In addition, configuration information for the pre-emption interval, as described in the first embodiment above, may be i) configured through higher layer signalling from the base station/network, ii) dynamically indicated through puncturing indication/pre-emption indication DCI, or iii) implicitly configured using a subcarrier spacing (SCS) value used for the puncturing indication/pre-emption indication DCI transmission or PDSCH transmission (e.g., the second PDSCH, the third PDSCH, and the fourth PDSCH) in which pre-emption-based resource assignment has been performed.

When a pre-emption interval, which is a time-section unit of pre-emption in the pre-emption window, is defined as described above, the puncturing indication/pre-emption indication DCI, as described in the first or second embodiment, may be defined i) to directly indicate an index for a pre-emption interval in which pre-emption occurs in the pre-emption window or ii) to indicate a pre-emption interval in which pre-emption occurs based on a bitmap.

When directly indicating an index for a pre-emption interval, one piece of UE-group common puncturing indication/pre-emption indication DCI may be defined to include information indicating pre-emption for only one pre-emption interval. If pre-emption occurs in a plurality of pre-emption intervals in the pre-emption window, UE-group common puncturing indication/pre-emption indication DCI may be separately configured and transmitted for the respective pre-emption intervals.

In addition, when the puncturing indication/pre-emption indication DCI includes bitmap-based pre-emption interval indication information, a plurality of pre-emption intervals, in which pre-emption occurs in the pre-emption window, may be indicated through one piece of puncturing indication/pre-emption indication DCI.

In the case described above, an information region may be separately defined to indicate frequency-section resources in which pre-emption occurs for the respective pre-emption intervals. The information region may be included in the puncturing indication/pre-emption indication DCI.

As a method for configuring information indicating frequency-section resources for the radio resources in which pre-emption has occurred through the UE-group common puncturing indication/pre-emption indication DCI, information indicating the frequency-section resources may be RB (Resource Block) or RBG (Resource Block Group)-based bitmap indication information as described in the first embodiment.

It is possible to perform configuration such that a bandwidth part that is a target of RBG or RB indication information (e.g., a UE-group common bandwidth part for pre-emption), in which puncturing or pre-emption has occurred through puncturing indication/pre-emption indication DCI, is configured by a base station/network and is transmitted, through higher layer signalling, to the user equipment that monitors pre-emption indication information. In addition, the RB or RBG indication information transmitted through the puncturing indication/pre-emption indication DCI is indication information for RBs or RBGs constituting a bandwidth part for pre-emption, which may be configured by the base station and may be interpreted by the user equipment.

Alternatively, configuration may be performed such that a plurality of bandwidth parts for pre-emption are set by the base station and indication information on a bandwidth part in which pre-emption occurs and RB or RBG indication information in the corresponding bandwidth part is transmitted through frequency-section resource indication information of the puncturing indication/pre-emption indication DCI.

In this case, a subcarrier spacing (SCS) value for defining RB grids constituting a bandwidth part for pre-emption may be defined i) to be configured by a base station/network and to be transmitted via higher layer signalling, ii) to be dynamically indicated through puncturing indication/pre-emption indication DCI, or iii) to be explicitly or implicitly configured by subcarrier spacing (SCS) values for transmission of PDSCHs (e.g., the second PDSCH, the third PDSCH, and the fourth PDSCH) in which the puncturing indication/pre-emption indication DCI or pre-emption-based resource assignment has been performed.

Alternatively, instead of configuring a separate bandwidth part for pre-emption, it is possible to perform configuration such that RB or RBG indication information, in which pre-emption has occurred with respect to frequency resources constituting the entire band of a corresponding NR component carrier (CC), is configured and transmitted by means of the puncturing indication/pre-emption indication DCI, and such that the user equipment interprets the RB or RBG indication information based on a UE-common RB grid defined on the basis of the entire band of the NR component carrier (CC).

In this case, a subcarrier spacing (SCS) value defining the UE-common RB grid may also be defined i) to be configured by a base station/network and to be transmitted via higher layer signalling, ii) to be dynamically indicated through puncturing indication/pre-emption indication DCI, or iii) to be explicitly or implicitly configured by subcarrier spacing (SCS) values for transmission of PDSCHs (e.g., the second PDSCH, the third PDSCH, and the fourth PDSCH) in which the puncturing indication/pre-emption indication DCI or pre-emption-based resource assignment has been performed.

Additionally, when information indicating frequency-section resources is configured in an RBG unit, the size of the RBG may be i) configured through higher layer signaling from a base station/network, ii) dynamically indicated through puncturing indication/pre-emption indication DCI, or iii) implicitly defined by subcarrier spacing (SCS) values for transmission of PDSCHs (e.g., the second PDSCH, the third PDSCH, and the fourth PDSCH), in which the puncturing indication/pre-emption indication DCI or pre-emption-based resource assignment has been performed, a bandwidth of the bandwidth part for pre-emption, or a bandwidth of an NR component carrier (CC).

Figure 4:
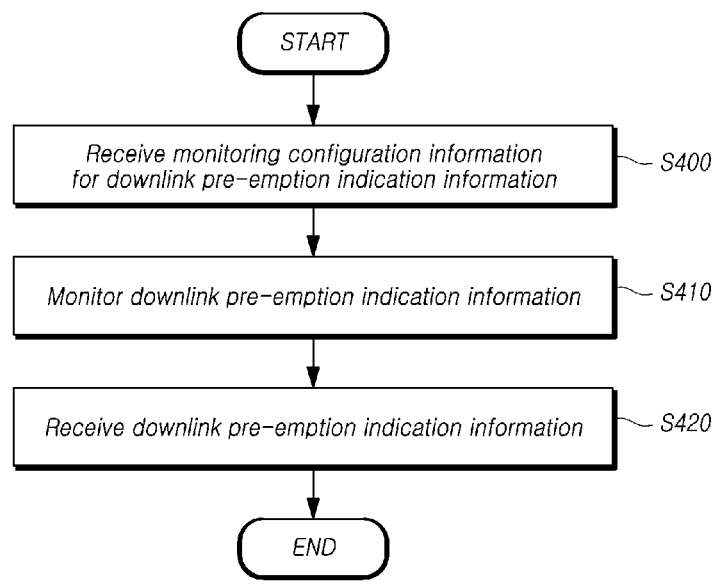
FIG. 4 is a flowchart illustrating a procedure of a user equipment for receiving downlink pre-emption indication information in at least one of embodiment.

FIG. 4 is a flowchart illustrating a procedure of a user equipment for receiving downlink pre-emption indication information according to at least one embodiment.

Referring to FIG. 4, a user equipment may receive monitoring configuration information for downlink pre-emption indication information from a base station (S400). The monitoring configuration information may include information on whether to monitor the downlink pre-emption indication.

That is, the monitoring configuration information may include information on whether the user equipment must monitor downlink pre-emption indication information, which is used to indicate whether downlink pre-emption has occurred. For example, an eMBB user equipment is required to monitor the downlink pre-emption indication information because the resources that have already been assigned to the eMBB user equipment are likely to be pre-empted by an URLLC user equipment. However, an URLLC user equipment may not be required to monitor the downlink pre-emption indication information because the resources that have already been assigned to the URLLC user equipment are unlikely to be pre-empted by another user equipments.

Next, the user equipment may monitor downlink pre-emption indication information based on the monitoring configuration information received in step S400 (S410).

If the user equipment monitors downlink pre-emption indication information, the user equipment may receive the downlink pre-emption indication information from the base station (S420).

At this time, the downlink pre-emption indication information may be indicated through group-common downlink control indication (DCI). The group-common DCI may be transmitted to the user equipment through a downlink control channel (PDCCH). That is, the user equipment may receive puncturing indication/pre-emption indication DCI described in the third embodiment above.

The downlink pre-emption indication information may include a bitmap indicating information on time-section resources or frequency-section resources in which pre-emption has occurred, among reference downlink resources.

Here, the reference downlink resources are target resource to be pre-empted. That is, pre-emption may occur in some region of the reference downlink resources, and the user equipment may determine the region where pre-emption has occurred in the reference downlink resources using the bitmap described above.

In this case, a time section of the reference downlink resources may be set by means of the pre-emption window described in the third embodiment, and a frequency section thereof may be set by means of the bandwidth part described in the third embodiment.

For example, the above-described bitmap may include 14 bits, wherein a bit of the bitmap may indicate one of M different time-section resources and may indicate one of N different frequency-section resources. Here, M and N denote natural numbers of 1 or more.

In this case, (M*N) different resources may be determined by M different time-section resources and N different frequency-section resources, and the respective resources must be mapped with different bits of the bitmap to distinguish between the resources. Therefore, it is possible to set two cases, where M=14 and N=1 and where M=7 and N=2, among the pairs of natural numbers M*N, which satisfy (M*N)=14.

Then, the user equipment may receive information, which is indication information among the downlink pre-emption indication information, for setting a unit of a time-section resource and a unit of a frequency-section resource, in which pre-emption has occurred, from the base station through higher layer signalling. The unit of the time-section resource may be represented by the pre-emption interval described in the third embodiment, and the unit of the frequency-section resource may be expressed by one or more RBs or RBGs described in the third embodiment.

For example, the user equipment may receive, from the base station, information on whether M and N correspond to M=14 and N=1 or M=7 and N=2 through the higher layer signalling such as an RRC. Then, the user equipment may set, as a time-section resource unit, a value obtained by dividing the total time-section resources of the reference downlink resources by M, and the user equipment may set, as a frequency-section resource unit, a value obtained by dividing the total time-section resources of the reference downlink resources by N. At this time, the case where M and N have values may be expressed using a 1-bit indicator because M and N have values according to one of two cases.

For another example, the user equipment may receive information explicitly indicating the number of symbols constituting the time-section resource unit or the number of RBs (or RBGs) constituting the frequency-section resource unit from the base station through higher layer signalling such as an RRC.

In this case, the time-section resource unit and the frequency-section resource unit indicated by a bit of the bitmap may be constant for all of the bits of the bitmap, or may be implicitly determined by means of a function of an index of the time-section resource (e.g., a slot index) and an index of the frequency-section resource (e.g., an RB index) indicated by a bit.

For example, in the case where the total time-section resources of the reference downlink resources include T symbols when M=14 and N=1, the time-section resource unit indicated by the first T−([T/14]×14) bits, among 14 bits constituting the bitmap, may be [T/14] symbols, and the time-section resource unit indicated by the remaining 14−T+([T/14]×14) bits may be [T/14] symbols.

Another example may be configured such that the total time-section resources of the reference downlink resources include T symbols when M=7 and N=2, the total frequency-section resources of the reference downlink resources include B PRBs, and 14 bits constituting a bitmap may be configured with 7 pairs of bits. In this case, the time-section resource unit indicated by the first T−([T/7]×7) bits, among 7 pairs of bits constituting the bitmap, may be [T/7] symbols, and the time-section resource unit indicated by the remaining 7−T+([T/7]×7) bits may be [T/7] symbols. In addition, the frequency-section resource unit indicated by the first bit, among the pairs described above, may be [B/2] PRBs, and the frequency-section resource unit indicated by the second bit may be [B/2] PRBs.

Figure 5:
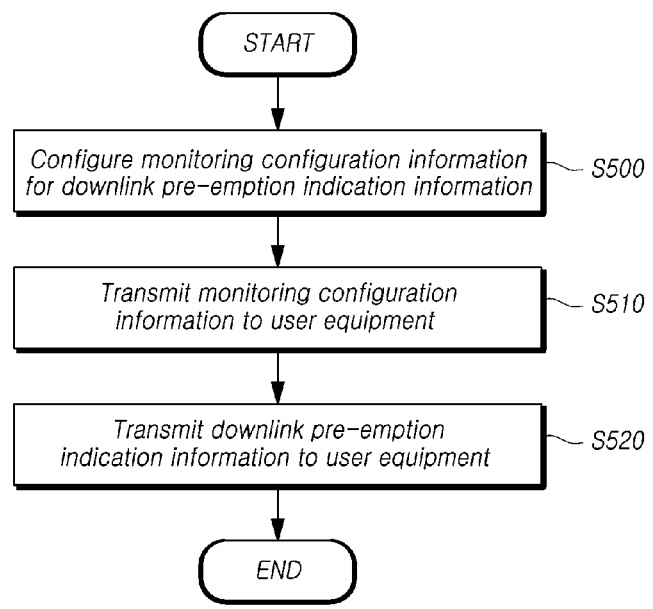
FIG. 5 is a flowchart illustrating a procedure of a base station for transmitting downlink pre-emption indication information in at least one embodiment.

FIG. 5 is a flowchart illustrating a procedure of a base station for transmitting downlink pre-emption indication information according to at least one embodiment.

Referring to FIG. 5, the base station may configure monitoring configuration information for downlink pre-emption indication information (S500). As described with reference to FIG. 4, the monitoring configuration information may include information on whether to monitor the downlink pre-emption indication.

Next, the base station may transmit the monitoring configuration information to the user equipment (S510).

In addition, if downlink pre-emption occurs, the base station may transmit downlink pre-emption indication information to the user equipment (S520).

At this time, the downlink pre-emption indication information may be indicated through group-common DCI. The group-common DCI may be transmitted to the user equipment through a downlink control channel (PDCCH). That is, the base station may transmit, to the user equipment, puncturing indication/pre-emption indication DCI described in the third embodiment above.

The downlink pre-emption indication information may include a bitmap indicating information on at least one of time-section resources and frequency-section resources in which pre-emption has occurred, from the reference downlink resources.

Here, the reference downlink resources are target resources to be pre-empted. That is, pre-emption may occur in some region of the reference downlink resources, and the base station may transmit, to the user equipment, information on the region where the pre-emption has occurred, among the reference downlink resources, using the bitmap described above.

In this case, a time section of the reference downlink resources may be set by means of the pre-emption window described in the third embodiment, and a frequency section thereof may be set by means of the bandwidth part described in the third embodiment.

For example, the above-described bitmap may include 14 bits, wherein a bit of the bitmap may indicate one of M different time-section resources and may indicate one of N different frequency-section resources. Here, M and N denote natural numbers of 1 or more, respectively.

In this case, (M*N) different resources may be determined by M different time-section resources and N different frequency-section resources, and the respective resources must be mapped with different bits of the bitmap to distinguish between the resources. Therefore, it is possible to set two cases, where M=14 and N=1 and where M=7 and N=2, among the pairs of natural numbers M*N, which satisfy (M*N)=14.

Then, the base station may transmit information, which is indication information among the downlink pre-emption indication information, for setting a unit of a time-section resource and a unit of a frequency-section resource, in which pre-emption has occurred, to user equipment through higher layer signaling. The unit of the time-section resource may be represented by the pre-emption interval described in the third embodiment, and the unit of the frequency-section resource may be expressed by one or more RBs or RBGs described in the third embodiment.

For example, the base station may transmit, to the user equipment, information on whether M and N correspond to M=14 and N=1 or M=7 and N=2 through the higher layer signalling such as an RRC. Then, the user equipment that has received the same may set, as a time-section resource unit, a value obtained by dividing the total time-section resources of the reference downlink resources by M, and may set, as a frequency-section resource unit, a value obtained by dividing the total time-section resources of the reference downlink resources by N.

For another example, the base station may transmit information explicitly indicating the number of symbols constituting the time-section resource unit or the number of RBs (or RBGs) constituting the frequency-section resource unit from to the user equipment through higher layer signaling such as an RRC.

Figure 6:
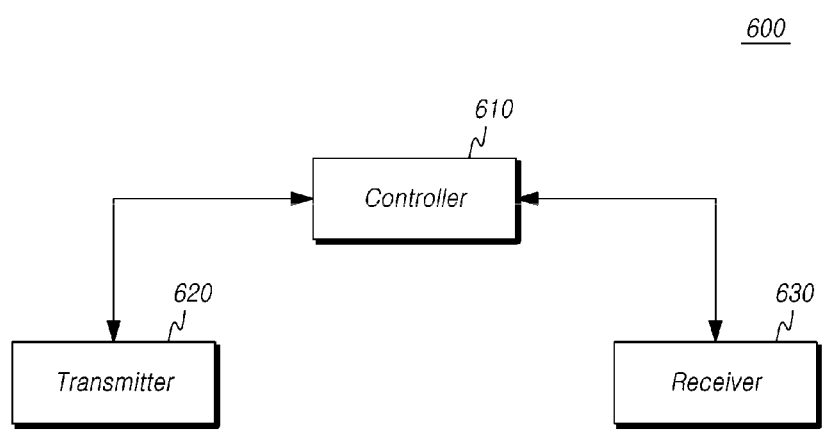
FIG. 6 is a block diagram illustrating a base station according to at least one of embodiments.

FIG. 6 is a block diagram illustrating a base station according to at least one of embodiments.

Referring to FIG. 6, a base station 600 includes a controller 610, a transmitter 620, and a receiver 630.

The controller 610 may configure monitoring configuration information for downlink pre-emption indication information. As described above, the monitoring configuration information may include information on whether to monitor the downlink pre-emption indication information.

The transmitter 620 and the receiver 630 are used to transmit and receive signals, messages, and data necessary for performing the present disclosure described above.

The transmitter 620 may transmit the monitoring configuration information to the user equipment, and the transmitter 620 may transmit the downlink pre-emption indication information to the user equipment when downlink pre-emption occurs.

At this time, the downlink pre-emption indication information may be indicated through group-common DCI. The group-common DCI may be transmitted to the user equipment through a downlink control channel (PDCCH). That is, the base station may transmit, to the user equipment, the puncturing indication/pre-emption indication DCI described in the third embodiment above.

In this case, the downlink pre-emption indication information may include a bitmap indicating information on time-section resources or frequency-section resources in which pre-emption has occurred, among the reference downlink resources, as described with reference to FIG. 5.

For example, the above-described bitmap may include 14 bits, wherein a bit of the bitmap may indicate one of M different time-section resources and may indicate one of N different frequency-section resources. Here, M and N denote natural numbers of 1 or more, respectively.

In this case, (M*N) different resources may be determined by M different time-section resources and N different frequency-section resources, and the respective resources must be mapped with different bits of the bitmap to distinguish between the resources. Therefore, it is possible to set two cases, where M=14 and N=1 and where M=7 and N=2, among the pairs of natural numbers M*N, which satisfy (M*N)=14.

Then, the base station may transmit information, which is indication information among the downlink pre-emption indication information, for setting a unit of a time-section resource and a unit of a frequency-section resource, in which pre-emption has occurred, to the user equipment through higher layer signaling. The unit of the time-section resource may be represented by the pre-emption interval described in the third embodiment, and the unit of the frequency-section resource may be expressed by one or more RBs or RBGs described in the third embodiment.

For example, the base station may transmit, to the user equipment, information on whether M and N correspond to M=14 and N=1 or M=7 and N=2 through the higher layer signalling such as an RRC. Then, the user equipment that has received the same may set, as a time-section resource unit, a value obtained by dividing the total time-section resources of the reference downlink resources by M, and may set, as a frequency-section resource unit, a value obtained by dividing the total time-section resources of the reference downlink resources by N.

For another example, the base station may transmit information explicitly indicating the number of symbols constituting the time-section resource unit or the number of RBs (or RBGs) constituting the frequency-section resource unit to the user equipment through higher layer signaling such as an RRC.

Figure 7:
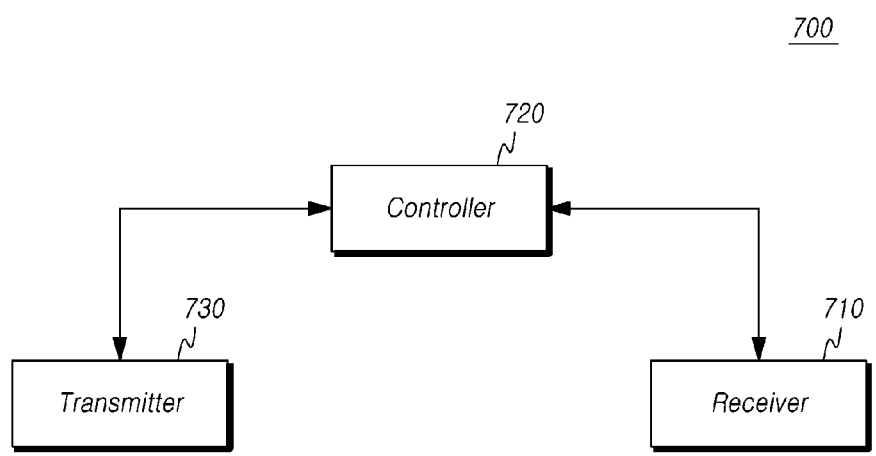
FIG. 7 is a block diagram illustrating a user equipment according to at least one of embodiments.

FIG. 7 is a block diagram illustrating a user equipment according to at least one of embodiments.

Referring to FIG. 7, a user equipment 700 includes a receiver 710, a controller 720, and a transmitter 730.

The receiver 710 receives, from the base station, downlink control information, data, and messages through a corresponding channel. More specifically, the receiver 710 may receive, from the base station, monitoring configuration information for the downlink pre-emption indication information, and the receiver 710 may also receive downlink pre-emption indication information.

As described above, the monitoring configuration information may include information on whether to monitor downlink pre-emption indication information.

The controller 720 may monitor downlink pre-emption indication information based on the monitoring configuration information.

The downlink pre-emption indication information may be indicated through group-common downlink control indication (DCI). The group-common DCI may be transmitted to the user equipment through a downlink control channel (PDCCH). That is, the user equipment may receive the puncturing indication/pre-emption indication DCI described in the third embodiment above.

The downlink pre-emption indication information may include a bitmap indicating information on at least one of time-section resources and frequency-section resources in which pre-emption has occurred, among the reference downlink resources. Here, the reference downlink resources denote target resources to be pre-empted as described with reference to FIG. 4.

For example, the above-described bitmap may include 14 bits, wherein a bit of the bitmap may indicate one of M different time-section resources and may indicate one of N different frequency-section resources. Here, M and N denote natural numbers of 1 or more, respectively.

In this case, (M*N) different resources may be determined by M different time-section resources and N different frequency-section resources, and the respective resources must be mapped with different bits of the bitmap to distinguish between the resources. Therefore, it is possible to set two cases, where M=14 and N=1 and where M=7 and N=2, among the pairs of natural numbers M*N, which satisfy (M*N)=14.

Then, the user equipment may receive information, which is indication information among the downlink pre-emption indication information, for setting a unit of a time-section resource and a unit of a frequency-section resource, in which pre-emption has occurred, from the base station through higher layer signalling. The unit of the time-section resource may be represented by the pre-emption interval described in the third embodiment, and the unit of the frequency-section resource may be expressed by one or more RBs or RBGs described in the third embodiment.

For example, the user equipment may receive, from the base station, information on whether M and N correspond to M=14 and N=1 or M=7 and N=2 through the higher layer signaling such as an RRC, thereby setting, as a time-section resource unit, a value obtained by dividing the total time-section resources of the reference downlink resources by M, and setting, as a frequency-section resource unit, a value obtained by dividing the total time-section resources of the reference downlink resources by N.

For another example, the user equipment may receive information explicitly indicating the number of symbols constituting the time-section resource unit or the number of RBs (or RBGs) constituting the frequency-section resource unit from the base station through higher layer signaling such as an RRC.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or to processor can be a component. One or more components may reside within a process and/or thread of execution and a component may be localized on one computer and/or distributed between two or more computers.

What is claimed is:

1. A method for receiving downlink pre-emption indication information by a user equipment, the method comprising:
    receiving monitoring configuration information for downlink pre-emption indication information from a base station;
    monitoring downlink pre-emption indication information based on the monitoring configuration information; and
    receiving the downlink pre-emption indication information from the base station,
    wherein the downlink pre-emption indication information comprises a bitmap indicating information on at least one of time-section resources and frequency-section resources in which pre-emption has occurred, among reference downlink resources,
    wherein respective bits of the bitmap are mapped with different resources to distinguish between resources and to indicate one of M different time-section resources and indicates one of N different frequency-section resources where M and N are a natural number equal to or greater than 1,
    wherein the bitmap comprises 14 bits, and
    wherein M and N have values such that M=14 and N=1 or M=7 and N=2.

2. The method of claim 1, wherein the downlink pre-emption indication information is indicated through group-common downlink control indication (DCI).

3. The method of claim 1, wherein the information for setting a unit of time-section resources and a unit of frequency-section resources is received from the base station through higher layer signaling.

4. A method for transmitting downlink pre-emption indication information by a base station, the method comprising:
    configuring monitoring configuration information for downlink pre-emption indication information;
    transmitting the monitoring configuration information to a user equipment; and
    transmitting the downlink pre-emption indication information to the user equipment when downlink pre-emption occurs,
    wherein the downlink pre-emption indication information comprises a bitmap indicating information on at least one of time-section resources a frequency-section resources in which pre-emption has occurred, among reference downlink resources,
    wherein respective bits of the bitmap are mapped with different resources to distinguish between resources and to indicate one of M different time-section resources and indicate one of N different frequency-section resources, where M and N are a natural number equal to or greater than 1,
    wherein the bitmap comprises 14 bits, and
    wherein M and N have values such that M=14 and N=1 or M=7 and N=2.

5. The method of claim 4, wherein the downlink pre-emption indication information is transmitted to the user equipment through group-common downlink control indication (DCI).

6. The method of claim 4, wherein the information for setting a unit of time-section resources and a unit of frequency-section resources is transmitted to the user equipment through higher layer signaling.

7. A user equipment for receiving downlink pre-emption indication information, the user equipment comprising:
    a receiver configured to receive monitoring configuration information for downlink pre-emption indication information from a base station and configured to receive the downlink pre-emption indication information from the base station; and
    a controller configured to monitor the downlink pre-emption indication information based on the monitoring configuration information,
    wherein the downlink pre-emption indication information comprises a bitmap indicating information on at least one of time-section resources and frequency-section resources in which pre-emption has occurred, among reference downlink resources,
    wherein respective bits of the bitmap are mapped with different resources to distinguish between resources and to indicate one of M different time-section resources and indicate one of N different frequency-section resources, where M and N are a natural number equal to or greater than 1,
    wherein the bitmap comprises 14 bits, and
    wherein M and N have values such that M=14 and N=1 or M=7 and N=2.

8. The user equipment of claim 7, wherein the downlink pre-emption indication information is indicated through group-common downlink control indication (DCI).

9. The user equipment of claim 7, wherein the information for setting a unit of time-section resources and a unit of frequency-section resources is received from the base station through higher layer signaling.

* * * * *